R. A. BOUSSON.
PROCESS AND MEANS FOR CONNECTING CABLES OR WIRES.
APPLICATION FILED DEC. 29, 1917.

1,318,961.

Patented Oct. 14, 1919.

INVENTOR
René Alexis Bousson
BY
ATTORNEYS

UNITED STATES PATENT OFFICE.

RENÉ ALEXIS BOUSSON, OF PARIS, FRANCE.

PROCESS AND MEANS FOR CONNECTING CABLES OR WIRES.

1,318,961.　　　　Specification of Letters Patent.　　Patented Oct. 14, 1919.

Application filed December 29, 1917. Serial No. 209,450.

*To all whom it may concern:*

Be it known that I, RENÉ ALEXIS BOUSSON, a citizen of the Republic of France, residing at Paris, 1 Rue Jean François Lépine, Seine Department, in the Republic of France, engineer, have invented certain new and useful Improved Processes and Means for Connecting Cables or Wires, of which the following is a specification.
This invention relates to a process and means for connecting cables or wires used in mechanical or electrical work.

According to the invention the connecting device employed comprises a tube of suitable section in which the two ends of the cable or wire to be connected can be placed side by side, and the wall of which is provided with holes for the passage of one or more rivets designed to be introduced by force between the said cables or wires.

It has already been proposed to employ connections of this kind the walls of which in front of the rivet holes, have recesses for receiving the parts of the cables or wires cracked or bent by the introduction of the rivet or rivets between them. With connections of this kind, the fixing of the cables or wires is only insured if the pressure exerted by the latter against the walls of the tube in front of the rivets is sufficiently great; now this pressure may vary considerably with slight differences of dimensions of the cables, rivets, etc., and when once the operation has been effected, the degree of pressure obtained, is not known and mistakes and accidents may result therefrom.

For the purpose of overcoming these objections the invention consists in employing a tubular connection having a rectilinear generatrix, that is to say, without recess made in front of the rivets, and in making this connection of a suitable ductile metal, such, for example, as copper, of suitable thickness, so that when one or more conical-pointed rivets are forced between the ends of cables or wires, the latter will force outward the wall of the tube thus forming more or less pronounced swellings; this lateral forcing will be still further increased when the rivets are clenched; the extent of projection of the swellings will notify the pressure exerted by the cables or wires, and allow of ascertaining, in a practical and certain manner, the security that can be relied upon of the connection thus effected.

Figure 1:
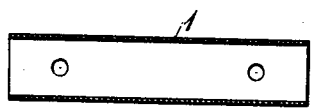

Figure 1 of the accompanying drawing shows by way of example, in longitudinal section, a connection made according to the invention before use.

Figure 2:

Fig. 2 is a transverse section thereof.

Figure 3:
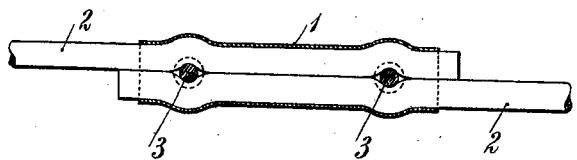

Fig. 3 shows the same connection 1 when the wires 2 have been placed in position, and the rivets 3 forcibly introduced between the said wires. This latter figure shows the swellings formed in the wall of the connection by the wires forced outward and compressed against the wall by the clenching of the rivets. The number of rivets may be varied.

Having now particularly described and ascertained the nature of my said invention and in what manner the same is to be performed, I declare that what I claim is:—

A tubular joint for joining the ends of metallic wires, consisting of a tube of internal constant and substantially uniform section from one end to the other, the wall of said tube having holes made in its sides for the passing through of rivets, and being sufficiently malleable to be forced from the inside outwardly by the metallic wires when the latter are separated by rivets introduced between substantially as described.

In testimony that I claim the foregoing as my invention I have signed my name in presence of two subscribing witnesses.

RENÉ ALEXIS BOUSSON.

Witnesses:
　CHARLES BAUDRY,
　CHAS. P. PRESSLY.